United States Patent [19]
Leibfried, Sr.

[11] Patent Number: 5,196,498
[45] Date of Patent: Mar. 23, 1993

[54] ORGANOSILICON POLYMERS

[75] Inventor: Raymond T. Leibfried, Sr., Newark, Del.

[73] Assignee: Hercules Incorporated, Wilmington, Del.

[21] Appl. No.: 764,746

[22] Filed: Sep. 24, 1991

[51] Int. Cl.$^5$ ............................................. C08G 77/06
[52] U.S. Cl. ...................................... 528/15; 525/478; 528/21; 528/24; 528/25
[58] Field of Search ................ 528/25, 15, 24, 21; 525/478

[56]  References Cited
U.S. PATENT DOCUMENTS

| | | | |
|---|---|---|---|
| 3,197,432 | 7/1965 | Lamoreaux | 260/46.5 |
| 3,197,433 | 7/1965 | Lamoreaux | 260/46.5 |
| 3,438,936 | 4/1969 | Lamoreaux | 260/46.5 |
| 4,581,391 | 4/1986 | Baldwin et al. | 523/179 |
| 4,900,779 | 2/1990 | Leibfried | 524/862 |
| 4,902,731 | 2/1990 | Leibfried | 523/222 |
| 5,008,360 | 4/1991 | Bard et al. | 528/25 |
| 5,068,303 | 11/1991 | Bard et al. | 528/25 |
| 5,077,134 | 12/1991 | Leibfried | 428/447 |
| 5,118,735 | 6/1992 | Burnier | 524/99 |
| 5,147,945 | 9/1992 | Leibfried et al. | 525/475 |

FOREIGN PATENT DOCUMENTS

| | | |
|---|---|---|
| 0423412 | 4/1991 | European Pat. Off. . |
| 0423688 | 4/1991 | European Pat. Off. . |
| 3064361 | 2/1989 | Japan . |

OTHER PUBLICATIONS

*Research Disclosure* 326103, p. 467 (Jun. 1991).

*Primary Examiner*—Melvyn I. Marquis
*Attorney, Agent, or Firm*—Mark D. Kuller

[57] ABSTRACT

Organosilicon polymers of polycyclic polyenes, cyclic polysiloxanes and/or tetrahedral siloxysilanes, and unsaturated hydrocarbyl group-bearing silicon compounds. The polymers are prepared by reacting the indicated compounds together, or by reacting the hydrocarbyl group-bearing silicon compounds with prepolymers of the polycyclic polyenes and cyclic polysiloxanes and/or tetrahedral siloxysilanes.

39 Claims, No Drawings

ORGANOSILICON POLYMERS

FIELD OF THE INVENTION

The present invention relates to novel organosilicon crosslinked polymers, and crosslinkable prepolymers, comprising residues of polycyclic polyenes having at least two carbon-carbon double bonds and cyclic polysiloxanes or tetrahedral siloxysilanes having at least two silylhydride groups. The present invention further pertains to processes for preparing these polymers and prepolymers.

BACKGROUND INFORMATION

A variety of organosilicon polymers are known in the art. For instance, BALDWIN et al., U.S. Pat. No. 4,581,391, discloses, as high temperature insulating materials, high viscosity linear siloxane polymers, characterized by high molar percentages of the vinylmethylsiloxane unit; the increased crosslink density of such polymers increases their char yield.

Also known in the art are organosilicon polymers characterized by alternating compound residues, at least one such residue being the residue of a silicon compound. For instance, LEIBFRIED '779, U.S. Pat. No. 4,900,779, and LEIBFRIED '731, U.S. Pat. No. 4,902,731, disclose alternating polycyclic polyene residues and cyclic polysiloxane or tetrahedral siloxysilane residues; LAMOREAUX '432, U.S. Pat. No. 3,197,432, discloses alternating cyclic polysiloxane residues and olefinic tetramer cyclic polysiloxane (for instance, tetravinyltetramethylcyclotetrasiloxane, hereinafter referred to as TVTMS) residues; and LAMOREAUX '433, U.S. Pat. No. 3,197,433, and LAMOREAUX '936, U.S. Pat. No. 3,438,936 also disclose vinyl bearing cyclic siloxanes.

There is no disclosure or suggestion in the art of organosilicon polymers comprising polycyclic polyene, and both:

cyclic polysiloxane and/or tetrahedral siloxysilane; and at least one silicon compound comprising two or more silicon atoms, each having an olefinically unsaturated hydrocarbyl group attached thereto (e.g., TVTMS). Further, it has been found that such polymers, of the instant invention, have advantages over the polymers previously known in the art —notably those of LEIBFRIED and LAMOREAUX.

As to the former, the final polymer products of LEIBFRIED '779 and LEIBFRIED '731 are prepared, as disclosed therein, from prepolymers obtained by reacting polycyclic polyenes with cyclic polysiloxanes or tetrahedral siloxysilanes. These prepolymers are characterized by a viscosity in the range of 4-100 stokes, at 25° C., which is high enough to be disadvantageous in certain applications.

For instance, the LEIBFRIED prepolymers can be combined with reinforcements and fillers, for molding into useful composite parts. Although these prepolymers have sufficient fluidity so that they can be processed to obtain reinforced composite parts, because of the degree of their viscosity, heating must often be used to promote flow, penetration, and wetting of the reinforcement.

Further heating can decrease the working time of the prepolymer in molding, composite lay ups, or filament winding. Accordingly, the viscosity of these prepolymers puts an upper limit on the amount of particulate filler which can be used in any application.

In contrast, combination of the previously discussed at least one further silicon compound with the prepolymer, in accordance with the instant invention, significantly decreases formulation viscosity. Moreover, the presence of this at least one further silicon compound also provides higher thermogravimetric analysis (TGA) residues with regard to the final polymer product.

As to the LAMOREAUX-type alternating residue polymers, these, upon curing, are extremely brittle, breaking during the Rheometrics Dynamic Spectrometer (RDS) mechanical test; the modulus (G') is in the $8-9 \times 10^9$ dynes/cm$^2$ range (0.8 GP$_a$) Phenyl silanes are added to decrease the brittleness of these polymers.

The polymers of the invention are not characterized by such brittleness, and therefore do not require such phenyl silane additives.

The polymers of the invention further have many useful characteristics, and can be employed in a variety of applications. These are discussed subsequently herein in detail.

SUMMARY OF THE INVENTION

According to the invention, there are provided organosilicon crosslinked polymers and crosslinkable prepolymers, comprising at least one polycyclic polyene, at least one first silicon compound, and at least one second silicon compound. Preferably, the polymers and prepolymers of the invention are hydrosilation reaction products of these three reactants, and at least one of these reactants has more than two reactive sites. Most preferably the first silicon compound contains 3 or more ≡SiH groups and the second silicon compound has three or more carbon-carbon double bonds.

The at least polycyclic polyene of the invention has at least two non aromatic, carbon-carbon double bonds in its rings. A preferred polycyclic polyene is dicyclopentadiene.

The first silicon compound of the invention is selected from the group consisting of cyclic polysiloxanes and trahedral siloxysilanes, has at least two ≡SiH groups, and, preferably, is selected from the group consisting of:

wherein R, which can be the same or different, is hydrogen, or a saturated, substituted, or unsubstituted alkyl or alkoxy radical, or a substituted or unsubstituted aromatic or aryloxy radical, n is an integer from 3 to about 20, and R is hydrogen on at least two of the silicon atoms, and

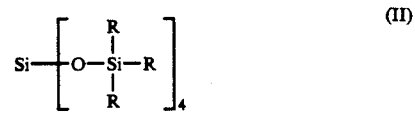

wherein R is as defined above, and is hydrogen on at least two silicon atoms in the molecule. Most preferably, the first silicon compound comprises a plurality of methylhydrocyclo siloxanes.

The at least one second silicon compound comprises at least one first silicon atom, having attached thereto at least one first hydrocarbyl group, and at least one second silicon atom, having attached thereto at least one second hydrocarbyl group. The indicated first and second hydrocarbyl groups can be either the same or different, and substantially each of these hydrocarbyl groups has at least one carbon-carbon double bond; further, substantially each of these hydrocarbyl groups is selected from the group consisting of:

terminally monoolefinic aliphatic groups, preferably having ten or fewer carbon atoms, and most preferably four or fewer carbon atoms;

aliphatic groups having at least one nonterminal carbon-carbon double bond, preferably having one carbon-carbon double bond and ten or fewer, most preferably four or fewer, carbon atoms;

alkyl groups;

cycloalkyl groups;

aromatic groups;

aralkyl groups; and alkaryl groups.

Preferably, the at least one second silicon compound has the formula:

wherein:

R is as defined above;

R' and R" may be the same or different, each, or at least substantially each, being a hydrocarbyl group containing at least one carbon-carbon double bond; and n' is an integer of from 3 to about 20.

In the more preferred compounds of the immediately preceding formula:

n' is 3 or 4, most preferably 3;

each R is the same, and is selected from the group consisting of methyl and phenyl, most preferably methyl; and R' and R" are the same, and are selected from the group consisting of vinyl and allyl, and are preferably vinyl.

Most preferably, the at least one second silicon compound comprises tetravinyltetramethylcyclotetrasiloxane or pentavinylpentamethylcyclopentasiloxane.

In a preferred embodiment of the organosilicon polymers and prepolymers of the invention, the ratio of (a) total carbon-carbon double bonds contributed by the at least one polycyclic polyene and the at least one second silicon compound to (b) total ≡SiH groups contributed by the at least one first silicon compound is from about 0.5:1 to about 1.8:1, more preferably 0.8:1 to 1.2:1.

The organosilicon polymers and prepolymers of the invention can further include linear, short chain SiH terminated polysiloxanes as described in U.S. application Ser. No. 419,430, filed Oct. 10, 1989 (now U.S. Pat. No. 5,077,134); hexamethyltrisiloxane is an example of such compounds.

As a particular embodiment, the organosilicon polymers of the invention can comprise the hydrosilation reaction product of the indicated at least one second silicon compound, with a prepolymer which is the hydrosilation reaction product of the indicated at least one polycyclic polyene and at least one first silicon compound. As to the reactants which make the prepolymer, the ratio of carbon-carbon double bonds in the at least one polycyclic polyene to ≡SiH groups in the first silicon compound is preferably about 0.5:1 to about 1.8:1, most preferably 0.8:1 to 1.2:1. Further, at least one of the at least one polycyclic polyene, the at least one first silicon compound, and the at least one second silicon compound has more than two reactive sites.

Further as to the organosilicon polymers of the invention comprising the indicated prepolymer and at least one second silicon compound, it is preferred that, of all the reactants used to prepare such organosilicon polymers, the ratio of (a) total carbon-carbon double bonds in the at least one polycyclic polyene and the at least one second silicon compound to (b) total ≡SiH groups in the at least one first silicon compound be 0.8:1 to 1.2:1, most preferably about 1:1. Particularly preferred embodiments of these polymers further include, in addition to the indicated prepolymer and the at least one second silicon compound, an additional amount of the at least one first silicon compound (which is necessary to provide the indicated 1:1 ratio). These polymers may yet further include linear, short chain SiH terminated polysiloxanes, such as hexamethyltrisiloxane.

The invention further relates to processes for preparing organosilicon polymers and prepolymers. One embodiment comprises reacting, in the presence of a hydrosilation catalyst, the at least one polycyclic polyene, the at least one silicon compound, and the at least one second silicon compound.

In another embodiment, the at least one second silicon compound is reacted, in the presence of a hydrosilation catalyst, with a prepolymer comprising the at least one polycyclic polyene and the at least one first silicon compound. As part of this embodiment, the prepolymer may be prepared by reacting the at least one polycyclic polyene and the at least one first silicon compound, also in the presence of a hydrosilation catalyst. As to these prepolymer reactants, the ratio of carbon-carbon double bonds in the at least one polycyclic polyene to ≡SiH groups in the at least one silicon compound is preferably about 0.5:1 to about 1.8:1, most preferably 0.8:1 to 1.2:1.

Further as to the polycyclic polyene, and as to the first and second silicon compounds utilized in this embodiment of the process of the invention, at least one of these reactants preferably has more than two reactive sites. Also as a matter of preference with regard to these reactants, the ratio of total carbon-carbon double bonds in the at least one polycyclic polyene and the at least one second silicon compound to total ≡SiH groups in the at least one first silicon compound is preferably 0.8:1 to 1.2:1, most preferably about 1:1.

This 1:1 ratio can be provided by including, in the reaction with the prepolymer, an additional amount of the at least one first silicon compound, besides that which has previously been incorporated into the prepolymer. This amount should be that which is sufficient to provide the indicated ratio of about 1:1.

DETAILED DESCRIPTION OF THE INVENTION

Herein, "SiH" is be used to describe hydrosilation reactable ≡SiH groups. These are also referred to herein as silylhydrides.

Any cyclic polysiloxane or tetrahedral siloxysilane with two or more hydrogen atoms bound to silicon is appropriate as the first silicon compound of the invention. Suitable such silicon compounds include those disclosed in LEIBFRIED '779, LEIBFRIED '731, LAMOREAUX '432, LAMOREAUX '433, LAMOREAUX '936, and BARD et al., U.S. Pat. No. 5,008,360.

Appropriate such polysiloxanes include those having the general formula (I), above. The methylhydrocyclosiloxanes (hereinafter MHCS), and mixtures thereof, are suitable such reactants. Examples include, e.g., tetraoctyl cyclotetrasiloxane, and hexamethyl tetracyclosiloxane; tetra- and penta-methylcyclotetrasiloxanes; tetra-, penta-, hexa- and hepta methylcyclopentasiloxanes; tetra-, penta- and hexa methylcyclohexasiloxanes, tetraethyl cyclotetrasiloxanes and tetraphenyl cyclotetrasiloxanes. Preferred are 1,3,5,7 tetramethylcyclotetrasiloxane, 1,3,5,7,9 pentamethylcyclopentasiloxane and 1,3,5,7,9,11-hexamethylcyclohexasiloxane, or blends thereof. In most cases, what is used is indeed a mixture of a number of species wherein n can vary widely, and reference hereinafter to MHCS can refer to such a mixture. Generally, commercial MHCS mixtures contain up to about 20% (in purer forms, as low as 2%) low molecular weight linear methylhydrosiloxanes, such as heptamethyltrisiloxane, octamethyltrisiloxane, etc. One suitable commercial mixture is Huls M8830 MHCS (Huls America, formerly Petrarch, Bristol, PA).

The tetrahedral siloxysilanes are represented by the general structural formula (II), above. Examples include tetrakisdimethylsiloxysilane, tetrakisdiphenyl siloxysilane, and tetrakisdiethylsiloxysilane. Tetrakisdimethylsiloxysilane is the best known and preferred species in this group.

Those compounds which are suitable as the second silicon compound of the invention include those cyclic polysiloxanes having the general formula (III), above. The indicated hydrocarbyl groups may be aliphatic radicals with one or more carbon-carbon double bonds, including terminal and/or internal olefinic unsaturation; eligible radicals are vinyl, allyl, 1-hexenyl, 3-octenyl, etc. Preferable aliphatic groups are those which are terminally monoolefinic, particularly those of four or fewer carbon atoms.

The hydrocarbyl groups may further be cycloalkyl, aromatic, aralkyl, or alkaryl groups, characterized by the indicated olefinic unsaturation.

A particular form of such second silicon compounds are those of the formula:

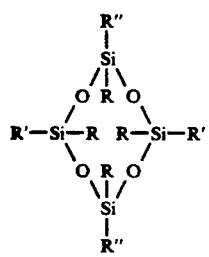

(IV)

wherein, R, R', and R" are as defined above. Those compounds which may be the second silicon compounds of the invention include the olefinic tetramers as disclosed in LAMOREAUX '432, the tetrafunctional cyclotetrasiloxanes and difunctional cyclotetrasiloxanes as disclosed in LAMOREAUX '433, and the olefinically unsaturated radical containing cyclotetrasiloxanes as disclosed in LAMOREAUX '936.

Preferred examples of the second silicon compound of the invention are TVTMS (available as T2160 from Huls America), and pentavinylpentamethylcyclopentasiloxane.

Polycyclic polyenes which can be employed include those as disclosed in LEIBFRIED '779 and LEIBFRIED '731. Particular such polycyclic polyenes are polycyclic hydrocarbon compounds having at least two non aromatic carbon-carbon double bonds in their rings. Exemplary compounds include cyclopentadiene oligomers (e.g., dicyclopentadiene, tricyclopentadiene, and tetracyclopentadiene), bicycloheptadiene (i.e., norbornadiene) and its Diels-Alder oligomers with cyclopentadiene (e.g., dimethanohexahydronaphthalene), norbornadiene dimer, hexahydronaphthalene, and substituted derivatives of any of these, e.g., methyl dicyclopentadienes. Dicyclopentadiene (hereinafter DCPD) is preferred. Two or more polycyclic polyenes can be used in combination.

There may be further reactants, in addition to the at least one first silicon compound, the at least one second silicon compound, and the at least one polycyclic polyene. It is understood that these, as subsequently discussed, are not provided by way of limitation, and that yet others, not specifically described, may also be suitable.

For instance, there may be one or more other hydrosilation reactable polysiloxanes bearing two or more SiH groups. Particular examples are linear, short chain SiH terminated polysiloxanes having the general formula:

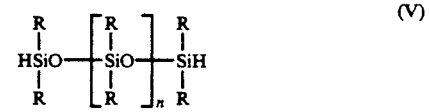

(V)

wherein n is 0 to 1000 and R is alkyl or aryl, preferably methyl or phenyl, as disclosed in U.S. application Ser. No. 419,430 (now U.S. Pat. No. 5,077,134). These linear, short chain SiH terminated polysiloxanes impart flexibility to the cured polymers and can be used to produce elastomers.

As examples of such polysiloxanes, disiloxanes, trisiloxanes, and other short siloxane oligomers, such as hexamethyltrisiloxane, are useful to lower viscosity, particularly for transfer molding operations where low viscosity is most desirable. In such a case, a blend of the second silicon compound and the linear, short chain ≡SiH terminated polysiloxane may be prepared and added to the prepolymer. Typically, the linear, short chain ≡SiH terminated polysiloxane comprises greater than 20%, preferably 25 to 75% of such a blend. The blend may also contain the first silicon compound.

The organosilicon prepolymers and polymers of the invention can be prepared utilizing the procedures and components, including, but not limited to, process steps and catalysts, as set forth in LEIBFRIED '779, LEIBFRIED '731, BARD et al., and U.S. application Ser.

No. 419,430 (now U.S. Pat. No. 5,077,134), and in BURNIER, U.S. Pat. No. 5,025,048, and U.S. application Ser. Nos. 588,627, filed Sep. 28, 1990, (now U.S. Pat. No. 5,118,735), 593,161, filed Oct. 5, 1990, (now U.S. Pat. No. 5,118,735) 593,167, filed Oct. 5, 1990 now U.S. Pat. No. 5,118,735, 593,168, filed Oct. 5, 1990, and 685,360, filed Apr. 15, 1991. The reactions for forming the prepolymer, and for forming a polymer from the prepolymer, can be promoted thermally, or by the addition of a hydrosilation catalyst or radical generators such as peroxides and azo compounds. The hydrosilation catalysts include metal salts and complexes of Group VIII elements. The preferred hydrosilation catalysts contain platinum (e.g., $PtCl_2$, dibenzonitrile platinum dichloride, platinum on carbon, etc.).

One such platinum catalyst which is suitable, in terms of both reactivity and cost, is chloroplatinic acid ($H_2PtCl_6 \cdot 6H_2O$); also appropriate are the platinum complex of divinyltetramethyldisiloxane (available as PC075 from Huls America), and the platinum containing catalysts PC072 and PC085 (available from Huls America). One preferred catalyst is a complex of chloroplatinic acid and dicyclopentadiene, as disclosed in BARD et al. Catalyst concentrations of 0.0005 to about 0.05% by weight of platinum, based on the weight of the monomers, are preferred.

To prepare the thermoset and thermoplastic polymers, several approaches are available. It is possible, by selection of reactants, reactant concentrations and reaction conditions, to prepare polymers exhibiting a broad range of properties and physical forms. Thus, it has been found possible to prepare tacky solids, elastomeric materials, and tough glassy polymers.

In a first approach, the correct relative ratios of reactants and the platinum catalyst are simply mixed and brought to a temperature at which the reaction is initiated. Proper temperature conditions are thereafter maintained to drive the reaction to substantial completion.

As a second, preferred approach, a prepolymer is first prepared from the at least one polycyclic polyene and the at least first silicon compound, in accordance with the procedure set forth in any of LEIBFRIED '779, LEIBFRIED '731, BARD et al., and U.S. application Ser. Nos. 419,430(now U.S. Pat. No. 5,077,134), 588,627 (now U.S. Pat. No. 5,068,303), 593,161 (now U.S. Pat. No. 5,118,735) 593,167, 593,168, and 685,360. The at least one second silicon compound, and any additional reactants, such as the previously discussed one or more other hydrosilation reactable polysiloxanes, are then reacted with this prepolymer. Such silicon compounds for reaction with the prepolymer can total up to 50% of the weight of the composition.

Viscosity is lowered and char yield (i.e., TGA residues) is increased by addition of the at least one second silicon compound, alone or in combination with the short chain, linear polysiloxane, as previously discussed, and/or with additional amounts of first silicon compound, as discussed elsewhere.

It is the addition of such second silicon compound, for reaction with the prepolymer, which increases TGA residues. The indicated additional first silicon compound does not affect this parameter. The additional short chain, linear polysiloxane can decrease char yields to some extent.

However, as to the final product (whether prepared from simply mixing the reactants, or by using the prepolymer), a sufficient excess (about 5%, based on the total number of hydrosilation reactive carbon-carbon double bonds and ≡SiH groups) of carbon-carbon double bonds from polycyclic polyene and second silicon compound, over SiH groups provided by first silicon compound, will cause lower glass transition temperatures in the final product. Particularly as to polymers of the invention prepared from the prepolymer, addition of second silicon polymer to the prepolymer can provide a sufficient carbon-carbon double bond excess to cause the glass transition temperature decrease; accordingly, to prevent, or at least lessen, the drop in glass transition temperature, these reactants are preferably employed in proportions so that the ratio of such carbon-carbon double bonds to SiH groups is about 1:1.

In the indicated first approach for preparing the polymers of the invention, this desired result is obtained simply by utilizing the proper reactant proportions to provide the requisite ratio of about 1:1. As to the preferred, second approach - i.e., where second silicon compound is reacted with prepolymer - this objective is accomplished by including, in addition to second silicon compound for reaction with the prepolymer, a sufficient amount of first silicon compound to provide the desired ratio.

The polymers of the invention are characterized by a number of advantageous properties, including excellent moisture resistance, low dielectric constant, good thermal stability, high glass transition temperatures, and low dissipation factor. They are suitable for a wide variety of uses, including semiconductor encapsulation, liquid molding prepreg fabrication, and coating applications.

Glass, carbon (graphite), quartz, aramid and other polymeric fibers are wetted very well by the liquid prepolymers of the invention, making them excellent matrix materials. Fiber can be in non-woven, unidirectional, woven, fabric, etc., form. The prepolymers of the invention are especially well suited for impregnating glass or other fibers for printed circuit board applications. Generally, prepregs and laminates contain from 25 to 65% by weight, of fibrous reinforcement, depending on the weave style. Fibers may be treated with a finish to enhance wetting and bonding of the prepolymer to the fiber.

Additives such as fillers and pigments are readily incorporated. Vermiculite, mica, wollastonite, calcium carbonate, sand, silica, fumed silica, ceramic beads, hollow glass, glass spheres, glass beads, ground glass, waste glass and other mineral fillers are examples of fillers which can be incorporated. Fillers can serve either as reinforcement or as fillers and extenders to reduce the cost of the molded product; glass spheres, in particular, are useful for preparing low density composites. Fillers can also be used for other reasons, such as viscosity modification. Fillers can be present in amounts up to about 15 weight % in glass fabric reinforced prepregs and in even higher amounts, i.e., up to about 85 weight %, when glass fibers are not used.

Stabilizers (anti-oxidants) are useful to maintain storage stability of the prepolymers, and thermal oxidative stability of final polymers. Preferred are bis(1,2,2,6,6-pentamethyl-4-piperidinyl) (3,5-di-tert-butyl-4-hydroxybenzyl)butylpropanedioate (available as Tinuvin® 144 from Ciba-Geigy Corp., Hawthorne, NY), or a combination of octadecyl 3,5-di tert butyl 4 hydroxyhydrocinnamate (also known as octadecyl 3-(3',5'-di-tert-butyl-4'-hydroxyphenyl) propionate) (available as Naugard TM 76 from Uniroyal Chemical Co., Middlebury, CT) and bis(1,2,2,6,6-pentamethyl-4-piperidinylsebacate) (available as Tinuvin ™ 765 from CibaGeigy Corp.). Stabilizers are generally used in an amount of about 0.5% to about 3.0%, based on the weight of the polymer or prepolymer of the invention. Generally, the stabilizers can be employed as disclosed in BURNIER, and in U.S. application Ser. No. 593,167 (now U.S. Pat. No. 5,118,735).

One or more elastomers can also be added to improve toughness. Preferred are hydrocarbon elastomers having a molecular weight of less than 100,000 and low molecular weight siloxane elastomers. Exemplary hydrocarbon elastomers are low molecular weight ethylene propylene diene terpolymers, low molecular weight butyl rubber, partially hydrogenated low molecular weight polyisoprene or natural rubber, and partially hydrogenated low molecular weight polybutadiene or styrene-butadiene copolymers. Exemplary siloxane rubbers include low molecular weight vinyl or SiH terminated polydimethyl/diphenyl siloxane copolymers. Preferred are low molecular weight ethylene-propylene-dicyclopentadiene and ethylene-propylene-ethylidenenorbornene polymers having a molecular weight of 5500 to 7000. Most preferred is Trilene 67 elastomer (available from Uniroyal Chemical Co.). The elastomer or elastomers are generally used in an amount of 0.5 to 20%, preferably 3 to 12%, and most preferably 5 to 10%, by weight of the total composition; higher levels may be useful in some applications. Generally, elastomers can be employed as disclosed in U.S. application Ser. Nos. 593,161 and 685,360.

The invention is illustrated by the following Examples, which are provided for the purpose of representation, and are not to be construed as limiting the scope of the invention. Unless stated otherwise, all percentages, parts, etc., are by weight.

PREPARATION OF PREPOLYMER

The prepolymer utilized in the Examples provided hereinafter was prepared by reacting 37.72 parts MHCS (Huls M8830 MHCS, Huls America (formerly Petrarch), Bristol, PA), containing 1.46 parts Naugard ™ 76 and 0.29 parts Tinuvin ™ 765, with 40.56 parts DCPD, having 0.61 equivalents olefin. Also present, as the catalyst, was 32 ppm chloroplatinic acid in DCPD, having been dissolved therein by heating. The reaction was conducted in 19.96 parts reagent grade toluene, by heating at 69-77° C. for 9½ hours.

After this reaction, the resulting solution was analyzed by H.NMR (Varian, Model EM 390 90MHz); 94.9% of the norbornene unsaturation was found to have been reacted, leaving an unreacted olefin to SiH equivalent ratio of 1.01:1.00. The toluene was removed by stripping under a vacuum of 50-100 mm Hg, leaving a neat prepolymer having a representative viscosity of 435 cSt.

COMPARATIVE EXAMPLE

This Example is of a crosslinked polymer prepared just from polycyclic polyene and first silicon compound, without the second silicon compound of the invention. It is provided for purposes of comparison with polymers of the invention, as set forth in the subsequent Examples.

100 ppm of PC075 platinum catalyst was added to the prepolymer, which was thereafter poured into a slotted mold. The catalyst-containing prepolymer was heated under inert gas to 125° C., and kept at this temperature for two hours; the temperature was then increased to 150° C. and held for one hour, after which the composition was allowed to cool.

After cooling, five hard, clear specimens, having dimensions of ½ × ½ × 1/8, were removed from the mold.

The specimens were post cured by means of a multi step process, comprising heating these specimens at 150° C. for three hours, then at 200° C. for two hours, then at 250° C. for another two hours.

EXAMPLE 1

A polymer blend was obtained by mixing 80 parts of the neat prepolymer with 8.2 parts MHCS and 11.8 parts of T2160 TVTMS, thereby providing an equimolar ratio of carbon-carbon double bonds to SiH groups; 100 ppm of PC075 platinum catalyst was added thereafter. This formulation was determined to have a representative viscosity of 50 cSt.

This blend was poured into a slotted mold, heated under inert gas to 125° C., and held at this temperature for two hours; the temperature was thereafter raised to 150° C., and maintained for four hours, after which the resulting hard, clear product was allowed to cool. Portions thereof were post-cured for two hours at 200° C., and for two hours at 250° C.

EXAMPLE 2

The procedure of Example 1 was followed, for preparation of both the blend and the final polymer product, except in that the initial polymer blend comprised 80 parts prepolymer, and 9 parts TVTMS, with 11 parts HMTS used instead of the 8.2 parts MHCS of Example 1.

EXAMPLE 3

The procedure of Example 1 was again followed, except with 80.8 parts prepolymer, 10.5 parts HMTS, and 8.7 parts TVTMS.

EXAMPLE 4

The procedure of Example 1 was again followed, except with 90 parts prepolymer, 4.5 parts TVTMS, and 5.5 parts HMTS. This initial formulation was determined to have a representative viscosity in the range of 85-110 cSt.

EXAMPLE 5

The procedure of Example 1 was again followed, except with 90 parts prepolymer, and 10 parts TVTMS. The initial formulation was determined to have a representative viscosity of 140 cSt.

EXAMPLE 6

The procedure of Example 1 was again followed, except with 80 parts prepolymer, and 20 parts TVTMS.

Specified properties of the initial formulations and final products in the Comparative Example, and in Examples 1-6, are set forth in the following Table. Specifically with regard to the Comparative Example, the data therefor are derived by averaging the results for the specimens.

Further as to the data provided in the Table, dynamic modulus was measured in a Rheometrics Dynamic Spectrometer Model 7700 (Rheometrics, Inc., Piscataway, NJ). A temperature sweep was carried out at a fixed frequency of 10 radians/second.

Thermogravimetric analysis was carried out in a DuPont Thermal Analyzer (E. I. duPont de Nemours & Company, Inc., Wilmington, DE) at 20° C./minute.

Thermal Mechanical Analysis and Thermal Expansion Coefficient were measured using a DuPont Thermomechanical Analyzer with a 100 mg load, and expansion probe at 10° C./minute.

TABLE

| | RESIN FORMULATION | DYNAMIC MECHANICAL ANALYSES | | THERMAL ANALYSIS | |
|---|---|---|---|---|---|
| | | Max. CURE TEMP. (C.) | (Tan D) Tg | G' | TMA Tg |
| Comparative | Initial Prepolymer Formulation | 150 (C.) | 163 C. | 9.40 E + 09 | 135 C. |
| Example | Final Product | 250 (C.) | 198 C. | 9.00 E + 09 | |
| Example 1 | Initial Prepolymer Formulation | 150 (C.) | 152 C. | 8.00 E + 09 | 125 C. |
| | Final Product | 250 (C.) | 190 C. | 9.00 E + 09 | 142 C. |
| Example 2 | Initial Prepolymer Formulation | 150 (C.) | 142 C. | 7.50 E + 09 | 100 C. |
| | Final Product | 250 (C.) | 166 C. | 7.20 E + 09 | 127 C. |
| Example 3 | Initial Prepolymer Formulation | 150 (C.) | — | — | 68 C. |
| | Final Product | 250 (C.) | — | — | 138 C. |
| Example 4 | Initial Prepolymer Formulation | 150 (C.) | 150 C. | 8.60 E + 09 | 135 C. |
| | Final Product | 250 (C.) | 192 C. | 8.60 E + 09 | 136 C. |
| Example 5 | Initial Prepolymer Formulation | 150 (C.) | 150 C. | 8.90 E + 09 | 117 C. |
| | Final Product | 250 (C.) | 185 C. | 8.30 E + 09 | 123 C. |
| Example 6 | Initial Prepolymer Formulation | 150 (C.) | 125 C. | 8.40 E + 09 | 98 C. |
| | Final Product | 250 (C.) | 158 C. | 8.10 E + 09 | 97 C. |

| | THERMAL ANALYSIS | | | | |
|---|---|---|---|---|---|
| | Coef. Lin. Exp. m/m C. | | TGA-Air | TGA-N2 | Viscosity |
| | (A) | (B) | % RESIDUE | % RESIDUE | (cSt.) |
| Comparative | 127.0 | | | | 435 |
| Example | 148 C. | 119.0 | | 39.04% | 51.17% |
| Example 1 | 141.0 | | | | 50 |
| | 129.0 | | 56.26% | 68.44% | |
| Example 2 | 116.0 | | | | — |
| | 107.0 | | 56.00% | 51.91% | |
| Example 3 | 144.0 | | 58.25% | 50.13% | — |
| | 108.0 | | 51.26% | 52.30% | |
| Example 4 | 101.0 | | | | 85–110 |
| | 98.4 | 60.7 | 44.34% | 50.11% | |
| Example 5 | 152.0 | | | | 140 |
| | 88.8 | 63.5 | 63.89% | 65.88% | |
| Example 6 | 113.0 | | | | — |
| | 109.0 | | 52.13% | 64.74% | |

(A) Thermal Coefficient of Expansion (TCE) from 50 to 285 C.
(B) TCE from 60 to 100 C.

An analysis of the foregoing data reveals certain points concerning the significance of various particular reactants to the formulations and products.

Example 1 included addition of both MHCS and TVTMS (specifically, 8.2% MHCS and 11.8% TVTMS) to the MHCS/DCPD (1:1) prepolymer. The presence of these two components significantly lowered the viscosity of the prepolymer formulation—i.e., from 435 cSt, for the prepolymer, to the 50 cSt viscosity of the Example 1 initial formulation. The final product of Example 1, incorporating the indicated TVTMS, showed significantly higher TGA residues (56.26% air, 68.44% nitrogen, 1000° C.) than the MHCS/DCPD (1:1) final product of the Comparative Example (39.04% air, 51.17% nitrogen, 1000° C.), the latter lacking the TVTMS component; however, glass transition temperatures for the two final products were found to be in the same range (190° C. RDS and 142° C. TMA for the former, as against 198° C. RDS and 148° C. TMA for the latter).

In Example 5, only TVTMS (specifically, 10%) was added to the prepolymer, in contrast to addition of both TVTMS and MHCS in Example 1; nevertheless, prepolymer formulation viscosity, as with Example 1, was still decreased—i.e., from 435 cSt for the prepolymer to 140 cSt for the Example 5 initial formulation. Moreover, also like those of Example 1, the final product TGA residues of Example 5 were significantly increased over the TGA residues of the Comparative Example final product (63.89% air and 65.88% nitrogen, 1000° C. for the former, as against 39.04% air and 51.17% nitrogen, 1000° C. for the latter).

Where the lack of MHCS in Example 5 was found to be significant was in the final product glass transition temperatures; the addition of TVTMS alone resulted in an excess of olefin unsaturation, causing lower final product glass transition temperatures for Example 5, as opposed to the Comparative Example final product glass transition temperatures (185° C. RDS and 123° C. TMA for the former, as opposed to 198° C. RDS and 148° C. TMA for the latter).

Examples 2–4 all differ from Example 1 and Example 5 in including HMTS, which was lacking from both Example 2 and Example 5; Examples 2 4 are like Example 1, and further unlike Example 5, in not including the addition of MHCS to the prepolymer, which was added in Example 1, but not in Example 5. Certain consequences of these similarities and differences, and of the similarities and differences in component proportions, are discussed below.

Both Example 2 and Example 3 were characterized by only a slightly lower proportion of TVTMS than Example 5 (Example 2–9% TVTMS; Example 3–8.7% TVTMS; Example 5–10% TVTMS) but a significant proportion of HMTS (Example 2–11% HMTS; Example 3–10.5% HMTS), in contrast to the lack of this compound in Example 5. Example 4 included a significantly lower proportion of TVTMS (4.5% TVTMS) than any of Examples 2, 3, and 5.

The significance of these proportions can be noted in the final product TGA residues, particularly the TGA-air residues. The presence of HMTS resulted in lower TGA air residues in Example 2 (56.00%) and Example 3 (51.26%) than were obtained in Example 5 (63.89%); however, the presence of amounts of TVTMS in Examples 2 and 3, only slightly less than in Example 5, provided significantly higher TGA air values for Examples 2 and 3 than were obtained in the Comparative Example (39.04%).

Example 4, with its significantly lower TVTMS proportion, resulted in a final product which was characterized by a relatively lower TGA-air residue (44.34%) than that of the final products in Examples 2, 3, and 5. However, the Example 4 TGA-air residue was still greater than that obtained in the Comparative Example, which, as indicated, included no TVTMS.

Further as to Example 4, viscosity was still lowered—i.e., from 435 cSt for the prepolymer, to 85-110 cSt for the Example 4 initial formulation—where a linear siloxane (i.e., HMTS) as well as a cyclic siloxane (TVTMS) were added to the prepolymer. Example 4 final product glass transition temperatures (192° C. RDS and 136° C. TMA) were in the same range as those of the Comparative Example (198° C. RDS and 148° C. TMA). Further, the thermal expansion coefficient of the Example 4 final product was 60.7 ppm/° C., over the 60-100° C. range; this appears to be lower than the thermal expansion coefficient of the Comparative Example final product.

The foregoing Examples demonstrate the versatility which is a feature of the invention. TGA residues can be increased by adding TVTMS, but the addition of linear siloxane—e.g., HMTS—can be employed as a counterbalance to this effect. Decreasing the amount of MHCS lowers glass transition temperatures, but the addition of TVTMS serves to compensate for this result; particularly, glass transition temperatures drop unless there is sufficient MHCS so that the amounts of olefinic and silyhydride equivalents are generally equal.

The presence of HMTS further results in increased molecular weight between crosslinks. It is believed that, in such instance, formulations can be slightly tougher when platinum complexes of tetravinyl siloxane are used, avoiding trace amounts of unwanted chain ends—however, this is provided only as the best hypothesis currently available, and is not intended to limit the scope of the invention.

Finally, although the invention has, as has been noted above, been described with reference to particular means, materials and embodiments, it should be noted that they are not intended to be limiting and that many variations and modifications are possible without departing from the scope of this invention.

What is claimed is:

1. An organosilicon crosslinked polymer or crosslinkable prepolymer which is the hydrosilation reaction product of:
   (a) at least one polycyclic polyene having at least two non-aromatic carbon-carbon double bonds in its rings;
   (b) at least one first silicon compound selected from the group consisting of cyclic polysiloxanes and tetrahedral siloxysilanes having at least two ≡SiH groups; and
   (c) at least one second silicon compound, comprising at least one first silicon atom and at least one second silicon atom:
      (i) said at least one first silicon atom having attached thereto at least one first hydrocarbyl group; and
      (ii) said at least one second silicon atom having attached thereto at least one second hydrocarbyl group; said first and second hydrocarbyl groups being the same or different;
      said first and second hydrocarbyl groups substantially each having at least one carbon-carbon double bond, and each being selected from the group consisting of:
         (A) terminally monoolefinic aliphatic groups;
         (B) aliphatic groups having at least one nonterminal carbon-carbon double bond;
         (D) cycloalkyl groups;
         (E) aromatic groups;
         (F) aralkyl groups; and
         (G) alkaryl groups;
   wherein at least one of said at least one polycyclic polyene, said at least one first silicon compound, and said at least one second silicon compound has more than two reactive sites; and
   wherein at least one of said first and said second hydrocarbyl groups is selected from the group consisting of:
      (I) terminally monoolefinic aliphatic groups having one carbon-carbon double bond and four or fewer carbon atoms; and
      (II) aliphatic groups having one nonterminal carbon-carbon double bond and four or fewer carbon atoms.

2. The organosilicon polymer or prepolymer of claim 1 wherein the ratio of (a) total carbon-carbon double bonds in said at least one polycyclic polyene and said at least one second silicon compound to (b) total ≡SiH groups in said at least one first silicon compound is from about 0.5:1 to about 1.8:1.

3. The organosilicon polymer or prepolymer of claim 2, wherein the ratio of (a) total carbon-carbon double bonds in said at least one polycyclic polyene and said at least one second silicon compound to (b) total ≡SiH groups in said at least one first silicon compound is from 0.8:1 to 1.2:1.

4. The organosilicon polymer or prepolymer of claim 3 wherein:
   (a) said at least one first silicon compound is selected from the group consisting of:

(i)                           (I)

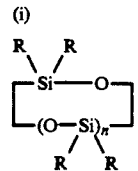

wherein R, which can be the same or different, is hydrogen, or a saturated, substituted, or unsubstituted alkyl or alkoxy radical, or a substituted or unsubstituted aromatic or aryloxy radical, n is an integer from 3 to about 20, and R is hydrogen on at least two of the silicon atoms; and (ii)

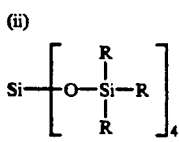
(II)

wherein R is as defined above and is hydrogen on at least two silicon atoms in the molecule; and (b) wherein said at least one second silicon compound has the formula:

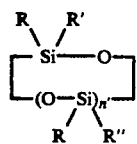
(III)

wherein:
(i) R is as defined above;
(ii) R' and R" are each selected from the group consisting of said first and second hydrocarbyl groups; and
(iii) n' is an integer of from 3 to about 20.

5. The organosilicon polymer or prepolymer of claim 4, wherein R' and R" are selected from the group consisting of:
(a) terminally monoolefinic aliphatic groups having four or fewer carbon atoms; and
(b) aliphatic groups having one carbon-carbon double bond and four or fewer carbon atoms.

6. The organosilicon polymer or prepolymer of claim 5, wherein, for said at least one second silicon compound:
(a) n' is 3 or 4;
(b) each R is the same, and is selected from the group consisting of methyl and phenyl; and
(c) R' and R" are the same, and are selected from the group consisting of vinyl and allyl.

7. The organosilicon polymer or prepolymer of claim 6, wherein n, is 3, R is methyl, and R' and R" are vinyl.

8. The organosilicon polymer or prepolymer of claim 4, further comprising a linear, short chain ≡SiH terminated polysiloxane.

9. The organosilicon polymer or prepolymer of claim 5, wherein:
(a) said at least one polycyclic polyene comprises dicyclopentadiene; and
(b) said at least one first silicon compound comprises a plurality of methylhydrocyclosiloxanes.

10. The organosilicon polymer or prepolymer of claim 9 wherein said at least one second silicon compound comprises tetravinyltetramethylcyclotetrasiloxane or pentavinylpentamethylcyclopentasiloxane.

11. The organosilicon polymer of claim 1 which is the hydrosilation reaction product of (a) a prepolymer which is the hydrosilation reaction product of said at least one polycyclic polyene and said at least one first silicon compound, the ratio of carbon-carbon double bonds in said at least one polycyclic polyene to ≡SiH groups in said first silicon compound being about 0.5:1 to about 1.8:1, and (b) said at least one second silicon compound.

12. The organosilicon polymer of claim 11, wherein the ratio, of total carbon-carbon double bonds in said at least one polycyclic polyene and said at least one second silicon compound to total ≡SiH groups in said at least one first silicon compound is 0.8:1 to 1.2:1.

13. The organosilicon polymer of claim 12 which is the hydrosilation reaction product of:
(a) sad prepolymer;
(b) said at least one second silicon compound; and
(c) the additional amount, of said at least one first silicon compound, which is necessary to provide the ratio, of total carbon-carbon double bonds in said at least one polycyclic polyene and said at least one second silicon compound to total ≡SiH groups in said at least one silicon compound of about 1:1.

14. A process of forming an organosilicon crosslinked polymer or crosslinkable prepolymer, comprising reacting, in the presence of a hydrosilation catalyst, the following reactants:
(a) at least one polycyclic polyene having at least two nonaromatic carbon-carbon double bonds in its rings;
(b) at least one first silicon compound selected from the group consisting of cyclic polysiloxanes and tetrahedral siloxysilanes having at least two ≡SiH groups; and
(c) at least one second silicon compound, comprising at least one first silicon atom and at least one second silicon atom;
(i) said at least one first silicon atom having attached thereto at least one first hydrocarbyl group; and
(ii) said at least one second silicon atom having attached thereto at least one second hydrocarbyl group; said first and second hydrocarbyl groups having being the same or different; said first and second hydrocarbyl groups, substantially each having at least one carbon-carbon double bond and each being selected from the group consisting of:
(A) terminally monoolefinic aliphatic groups;
(B) aliphatic groups having at least one nonterminal carbon-carbon double bond;
(C) alkyl groups;
(D) cycloalkyl groups;
(E) aromatic groups;
(F) aralkyl groups; and
(G) alkaryl groups;
wherein at least one of said at least one polycyclic polyene, said at least one first silicon compound, and said at least one second silicon compound has more than two reactive sites.

15. The process of claim 14, wherein the ratio of (a) total carbon-carbon double bonds in said at least one polycyclic polyene and said at least one second silicon compound to (b) total ≡SiH groups in said at least one first silicon compound is from about 0.5:1 to about 1.8:1.

16. The process of claim 15, wherein the ratio of (a) total carbon-carbon double bonds in said at least one polycyclic polyene and said at least one second silicon compound to (b) total ≡SiH groups in said at least one first silicon compound is from 0.8:1 to 1.2:1.

17. The process of claim 15, wherein at least one of said first and said second hydrocarbyl groups is selected from the group consisting of:
(I) terminally monoolefinic aliphatic groups having one carbon-carbon double bond and about ten or fewer carbon atoms; and (II) aliphatic groups having one nonterminal carbon-carbon double bond and about ten or fewer carbon atoms.

18. The process of claim 15, wherein:
(a) said at least one first silicon compound is selected from the group consisting of:

(i)

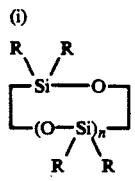

(I)

wherein R, which can be the same or different, is hydrogen, or a saturated, substituted, or unsubstituted alkyl or alkoxy radical, or a substituted or unsubstituted aromatic or aryloxy radical, n is an integer from 3 to about 20, and R is hydrogen on at least two of the silicon atoms; and (ii)

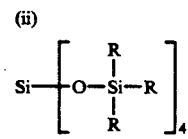

(II)

wherein R is as defined above and is hydrogen on at least two silicon atoms in the molecule; and
(b) wherein said at least one second silicon compound has the formula:

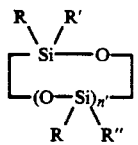

(III)

wherein:
(i) R is as defined above;
(ii) R' and R'' are each selected from the group consisting of said first and second hydrocarbyl groups; and
(iii) n, is an integer of from 3 to about 20.

19. The process of claim 18, wherein for said at least one second silicon compound:
(a) n' is 3 or 4;
(b) each R is the same, and is selected from the group consisting of methyl and phenyl; and
(c) R' and R'' are the same, and are selected from the group consisting of vinyl and allyl.

20. The process of claim 19, wherein:
(a) said at least one polycyclic polyene comprises dicyclopentadiene; and
(b) said at least one first silicon compound comprises a plurality of methylhydrocyclosiloxanes.

21. The process of claim 20, wherein said at least one second silicon compound comprises tetravinyltetramethylcyclotetrasiloxane or pentavinylpentamethylcyclopentasiloxane.

22. The process of claim 18 for forming an organosilicon crosslinked polymer, comprising the following steps:
(a) reacting, in the presence of a hydrosilation catalyst, said at least one polycyclic polyene and said at least one first silicon compound, to form a prepolymer, the ratio of carbon-carbon double bonds in said at least one polycyclic polyene to ≡SiH groups in said at least one first silicon compound being about 0.5:1 to about 1.8:1, and
(b) reacting, in the presence of a hydrosiliation catalyst, said prepolymer with said at least one second silicon compound.

23. The process of claim 22, the ratio of (a) total carbon-carbon double bonds in said at least one polycyclic polyene and said at least one second silicon compound to (b) total ≡SiH groups in said at least one first silicon compound being 0.8:1 to 1.2:1.

24. The process of claim 23, the ratio of (a) total carbon-carbon double bonds in said at least one polycyclic polyene and said at least one second silicon compound to (b) total ≡SiH groups in said at least one first silicon compound being about 1:1.

25. The process of claim 24, further comprising reacting, with said prepolymer and said at least one second silicon compound, the additional amount of said at least one first silicon compound which is necessary to provide the ratio of total carbon-carbon double bonds in (a) said at least one polycyclic polyene and said at least one second silicon compound to (b) total ≡SiH groups in said at least one silicon compound of about 1:1.

26. The process of claim 25, further comprising reacting a linear, short chain ≡SiH terminated polyorganosiloxane with said prepolymer, said at least one second silicon compound, and said additional amount of said at least one first silicon compound.

27. The process of claim 26, wherein said linear, short chain ≡SiH terminated polysiloxane is selected from the group consisting of disiloxanes and trisiloxanes.

28. The process of claim 25, wherein:
(a) said at least one polycyclic polyene comprises dicyclopentadiene;
(b) said at least one first silicon compound comprises a plurality of methylhydrocyclosiloxanes; and
(c) said at least one second silicon compound comprises tetravinyltetramethylcyclotetrasiloxane or pentavinylpentamethylcyclopentasiloxane.

29. The process as claimed in claim 18, wherein R' and R'' are selected from the group consisting of (A) terminally monoolefinic aliphatic groups having four or fewer carbon atoms and (B) aliphatic groups having one carbon-carbon double bond and four or fewer carbon atoms.

30. The polymer or prepolymer of claim 1 which is reinforced with fibers or fillers.

31. A blend comprising;
(I) a prepolymer which is the reaction product of at least one polycyclic polyene having at least two nonaromatic carbon-carbon double bonds in its rings and (b) at least one first silicon compound selected from the group consisting of cyclic polysiloxanes and tetrahedral siloxysilanes having at least two ≡SiH groups, wherein at least one of (a) or (b) has more than two reactive sites; and
(II) at least one second silicon compound comprising at least one first silicon atom at least one second silicon atom;
(i) said at least one first silicon atom having attached thereto at least one first hydrocarbyl group; and
(ii) said at least one second silicon atom having attached thereto at least one second hydrocarbyl group; said first and second hydrocarbyl groups being the same or different;

said first and second hydrocarbyl groups substantially each having at least one carbon-carbon double bond, and each being selected from the group consisting of:
  (A) terminally monoolefinic aliphatic groups;
  (B) aliphatic groups having at least one nonterminal carbon-carbon double bond;
  (C) alkyl groups;
  (D) cycloalkyl groups;
  (E) aromatic groups;
  (F) aralkyl groups; and
  (G) alkaryl groups;

32. The blend of claim 31, wherein at least one of said first and second hydrocarbyl groups is selected from the group consisting of:
  (I) terminally monoolefinic aliphatic groups having one carbon-carbon double bond and ten or fewer carbon atoms; and
  (II) aliphatic groups having one nonterminal carbon-carbon double bond and ten or fewer carbon atoms.

33. The blend of claim 31, wherein the ratio of (a) total carbon-carbon double bonds in said at least one polycyclic polyene and said at least one second silicon compound to (b) total ≡SiH groups in said at least one first silicon compound is from 0.8:1 to 1.2:1.

34. The blend of claim 33 wherein:
  (a) said at least one first silicon compound is selected from the group consisting of:

(i)

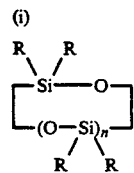
(I)

wherein R, which can be the same or different, is hydrogen, or a saturated, substituted, or unsubstituted alkyl or alkoxy radical, or a substituted or unsubstituted aromatic or aryloxy radical, n is an integer from 3 to about 20, and R is hydrogen on at least two of the silicon atoms; and
  (ii)

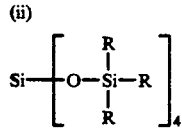
(II)

wherein R is as defined above and is hydrogen on at least two silicon atoms in the molecule; and (b) wherein said at least one second silicon compound has the formula:

(III)

wherein:
  (i) R is as defined above;
  (ii) R' and R" are each selected from the group consisting of said first and second hydrocarbyl groups; and
  (iii) n' is an integer of from 3 to about 20.

35. The blend of claim 31 which contains (III) an additional amount of said at least one first silicon compound which is necessary to provide the ratio of total carbon-carbon double bonds in said at least one polycyclic polyene and said at least one second silicon compound to total ≡SiH groups in said at least one silicon compound of about 1:1.

36. The blend of claim 33, wherein:
  (a) said at least one polycyclic polyene comprises dicyclopentadiene;
  (b) said at least one first silicon compound comprises a plurality of methylhydrocyclosiloxanes; and
  (c) said at least one second silicon compound comprises tetravinyltetramethylcyclotetrasiloxane or pentavinylpentamethylcyclopentasiloxane.

37. The process as claimed in claim 18, wherein R' and R" are selected from the group consisting of (A) terminally monoolefinic aliphatic groups having four or fewer carbon atoms and (B) aliphatic groups having one carbon-carbon double bond and four or fewer carbon atoms.

38. The blend of claim 31 wherein at least one of said first and second hydrocarbyl groups is selected from the group consisting of:
  (I) terminally monoolefinic aliphatic groups having one carbon-carbon double bond and four or fewer carbon atoms; and
  (II0 aliphatic groups having one nonterminal carbon-carbon double bond and four or fewer carbon atoms.

39. The process of claim 14, wherein at least one of said first and second hydrocarbyl groups is selected from the group consisting of:
  (I) terminally monoolefinic aliphatic groups having one carbon-carbon double bond and four or fewer carbon atoms; and
  (II) aliphatic groups having one nonterminal carbon-carbon double bond and four or fewer carbon atoms.

* * * * *

UNITED STATES PATENT AND TRADEMARK OFFICE
CERTIFICATE OF CORRECTION

PATENT NO. : 5,196,498

DATED : March 23, 1993

INVENTOR(S) : Raymond T. Leibfried

It is certified that error appears in the above-identified patent and that said Letters Patent is hereby corrected as shown below:

Claim 1, Col. 14, after line 18, insert
--(C) alkyl groups;--.

Claim 13, Col. 16, line 5, "(a) sad" should read --(a) said--.

Claim 14, Col. 16, line 35, delete --having--.

Claim 31, Col. 18, line 50, "comprising;" should read
--comprising:--.

Claim 31, Col. 18, line 61, "silicon atom;" should read
--silicon atom:--.

Claim 31, Col. 19, line 12, "(G) alkaryl groups;" should
read --(G) alkaryl groups.--.

Claim 38, Col. 20, line 44, "(II0" should read --(II)--.

Signed and Sealed this

Fourteenth Day of December, 1993

*Attest:*

BRUCE LEHMAN

*Attesting Officer*     *Commissioner of Patents and Trademarks*